(12) United States Patent
Miller (10) Patent No.: US 10,393,614 B2
(45) Date of Patent: Aug. 27, 2019

(54) SYSTEM AND A METHOD FOR TESTING A PIPE JOINT

(71) Applicant: Michael R. Miller, Churubusco, IN (US)

(72) Inventor: Michael R. Miller, Churubusco, IN (US)

( * ) Notice: Subject to any disclaimer, the term of this patent is extended or adjusted under 35 U.S.C. 154(b) by 79 days.

(21) Appl. No.: 15/827,110

(22) Filed: Nov. 30, 2017

(65) Prior Publication Data

US 2019/0078964 A1 Mar. 14, 2019

Related U.S. Application Data

(63) Continuation of application No. 15/700,759, filed on Sep. 11, 2017.

(51) Int. Cl.
*G01M 3/28* (2006.01)

(52) U.S. Cl.
CPC ....... *G01M 3/2853* (2013.01); *F16L 2201/30* (2013.01)

(58) Field of Classification Search
CPC .................. G01M 3/2853; F16L 2201/30
See application file for complete search history.

(56) References Cited

U.S. PATENT DOCUMENTS

| 3,779,068 | A | * | 12/1973 | Forsythe | G01M 3/005 138/90 |
| 4,572,228 | A | | 2/1986 | Larson et al. | |
| 4,691,728 | A | | 9/1987 | Mathison | |
| 4,763,511 | A | * | 8/1988 | Mathison | F16L 55/163 138/90 |
| 4,926,680 | A | | 5/1990 | Hasha | |
| 5,066,208 | A | * | 11/1991 | Warmerdam | F16L 55/16455 138/93 |
| 5,209,105 | A | | 5/1993 | Hasha | |
| 5,323,641 | A | | 6/1994 | Tolliver | |
| 6,073,481 | A | * | 6/2000 | Barefoot | B23K 9/0282 73/37 |

FOREIGN PATENT DOCUMENTS

DE     102008011702 A1 *  9/2009  .............. F17D 5/02

* cited by examiner

*Primary Examiner* — Xin Y Zhong
(74) *Attorney, Agent, or Firm* — Hill Wallack LLP; Jason L DeFrancesco (57) ABSTRACT

A system (100) for testing a pipe joint comprises a pipe joint having a male pipe section (102) and a female pipe section (104), a test port (106) disposed in a test space provided on the male pipe section (102) and a testing apparatus comprising a needle (112), a tubing (114) and a pressure supply assembly (116). Further, the test space is a cavity provided in the male pipe section (102). Further, test port (106) connects an annular space (110) created at a junction of the male pipe section (102) and female pipe section (104) by providing gaskets (108). Further, the tubing (114) comprises a puck (805) adapted to extract the needle (112) from the test port (106).

4 Claims, 12 Drawing Sheets

SYSTEM AND A METHOD FOR TESTING A PIPE JOINT

CROSS-REFERENCE TO RELATED APPLICATION

This application is continuation in part application of U.S. Non-Provisional application Ser. No. 15/700,759, filed on Sep. 11, 2017.

TECHNICAL FIELD

The present invention relates generally to the field of pipeline testing, and more specifically to a system and a method for testing a pipe joint.

BACKGROUND

The current state of pipeline installation frequently requires that the installed pipeline be free from leakage, from either infiltration (external water entering system) or exfiltration (contained fluids leaving system). Methods of joining pipe sections into a continuous pipeline include welding, flange coupling, and compressive seals. These methods apply to joints made using compressive seals.

Moreover, quality assurance testing of the installed pipe is generally limited to testing of joints, and utilizes a number of methods which require either large amounts of water, or expensive equipment, or both. Most test methods measure either infiltration or exfiltration only. Currently, pipelines are too small to be physically entered and therefore are limited in what techniques can be used for testing them, and so most remain untested after installation. Larger pipes (usually 30" diameter and larger), which can be entered, require expensive and cumbersome testing equipment which can test only one size pipe. Additionally, some installations utilizing flexible pipes exceed the recommended limitations of the test equipment, rendering the test equipment unusable. All of these limitations greatly increase the expense and effort required to test installed pipelines, resulting in additional costs or burying untested pipelines. They also require OSHA confined-space entry, requiring additional danger to staff testing the joints. Additionally, when pipe joints fail, they require repair.

In light of the discussion above, there is clearly a need in the art for a better a system and a method for testing pipe joint that does not suffer from the above mentioned deficiencies.

SUMMARY

Embodiments of the present invention aim to provide a system and a method for testing a pipe joint. The present invention provides a test port that is disposed into a male pipe section of the pipe joint. Further, the pipe joint includes an annular space sealed by two gaskets. The testing is done in that annular space for checking the sealing by the gaskets. The present invention provides a simple, portable, and light-weight air pressure supply system. The present system works at low pressure as compared to conventional systems so there is no requirement to use bulky air compressor machinery and long hoses for testing the pipe joint. Further, the present invention works on any diameter of pipe and there is no requirement for OSHA confined-space entry.

According to first aspect of the present invention, a system for testing pipe joint comprises a pipe joint having a male pipe section and a female pipe section, a test port disposed in a test space provided on the male pipe section between the two gaskets, and a testing apparatus comprising a needle, reinforced tubing attached to the needle, a pressure supply assembly attached to the tubing in order to provide a predetermined air pressure and a ballast adapted to position and confine the tubing in order to provide necessary extraction thrust to remove the needle from the test port. Further, the test port is installed into the male pipe section during manufacture such that it lays between the two sealing surface within the closed joint.

Further, the test port is fixed into the interior diameter of the male pipe section and is secured into the test space of the male pipe section using a fastening means. Further, the test port connects an annular space created at a junction of the male pipe section and female pipe section by providing gaskets.

In accordance with embodiment of the invention, the annular space is compressively sealed by gaskets.

In accordance with embodiment of the invention, the fastening means is one of adhesive, spin-welding, or solvent welding, or mechanical method.

In accordance with embodiment of the invention, the test port comprises a hollow barrel with a flange, an orifice provided on the flange intrudes into the hollow barrel and a compressive sealing material provided inside the barrel in order to provide a secure sealing inside the test port.

In accordance with embodiment of the invention, the compressive sealing material is of resilient material adapted to provide secure sealing while the needle is inside the test port, both before and after the needle is inserted.

In accordance with embodiment of the invention the needle comprises a hollow shaft having a base and end orifice adapted to receive an air pressure to pressurize the annular space for testing the pipe joint.

In accordance with embodiment of the invention the needle further includes a rounded tip adapted to feed air pressure into the annular space by passing through the compressive sealing material of the test port.

In accordance with embodiment of the invention the tubing is capable of suppling test pressure, providing repair material and extracting the needle from the test port.

In accordance with embodiment of the invention the pressure supply assembly comprises a compressor adapted to feed air pressure to a pressure manifold, a control valve capable of isolating the pressure manifold from the compressor, a relief valve adapted to prevent over pressurizing the system and a test gauge configured to measure the air pressure fed to the system.

In accordance with embodiment of the invention the pressure/vacuum assembly includes a vacuum source capable of creating a negative pressure in the annular space for testing the pipe joint.

In accordance with embodiment of the invention, the system further includes a repair unit comprises a drive unit, a video and light unit mounted on a drive unit and a controllable tubular arm mounted on a drive unit with a repair needle. Further, the repair unit is capable of injecting a repair material into the annular space through the repair needle for repairing the faulty pipe joint.

According to another aspect of the present invention a system for testing a pipe joint, comprises a pipe joint having a male pipe section and a female pipe section, a test port disposed in a test space provided on the male pipe section and a testing apparatus. The testing apparatus comprises a needle, tubing attached to the needle, a pressure supply assembly attached to the tubing in order to provide a predetermined air pressure while testing of the pipe joint.

Further, the test space is a cavity provided in the male pipe section. Further, the test port is fixed into the interior diameter of the male pipe section and is secured into the test space of the male pipe section using a fastening means. Further, the test port connects an annular space created at a junction of the male pipe section and female pipe section by providing gaskets. Further, the tubing comprises a puck adapted to extract the needle from the test port.

In accordance with embodiment of the invention, the shape of the puck is hemispherical.

In accordance with embodiment of the invention, the tubing further comprises a resilient cover adapted to protect the tubing from excessive withdrawal force and assists in translation of thrust.

In accordance with embodiment of the invention, the resilient cover is a spring.

In accordance with embodiment of the invention, a method of performing the test comprises steps of, inserting ballast with tubing into a female end of a test pipe such that the ballast is under a pipe joint to be tested, inserting a needle manually, through an orifice of a test port by reaching into the male end of the test pipe, joining pipes together to close a pipe joint and seal annular space between the male and female pipe joint using resilient gaskets, applying pressure from a compressor through tubing until test pressure is achieved in the annular space, closing a control valve to isolate the annular space from the compressor, measuring the pressure performance of pipe joint as required by test parameters and extracting the ballast with the tubing from the female end of the test pipe by removing needle from the test port.

In accordance with embodiment of the invention the ballast is capable of translating a linear pull of the tubing into a vertical withdrawal of the needle from the test port.

BRIEF DESCRIPTION OF THE DRAWINGS

So that the manner in which the above recited features of the present disclosure can be understood in detail, a more particular description of the disclosure is illustrated in the appended drawings. It is to be noted, however, that the appended drawings illustrate only typical embodiments of the disclosure and are therefore not to be considered limiting in scope, as the disclosure may support other equally effective embodiments.

These and other features, benefits, and advantages of the present disclosure will become apparent by reference to the following figures, with like reference numbers referring to like structures across the views, wherein.

DETAILED DESCRIPTION

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "two or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure.

Figure 1:
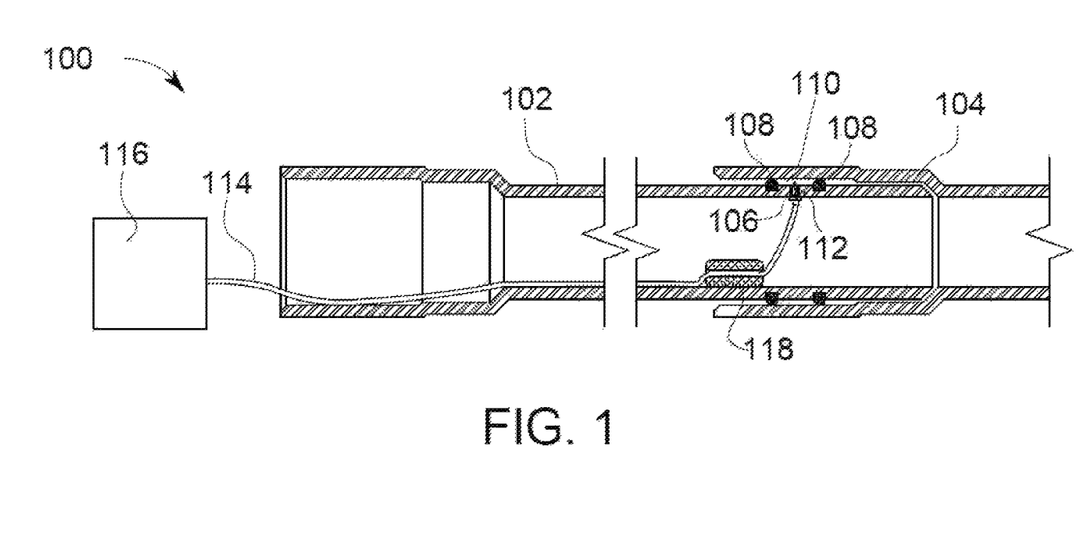
FIG. 1 illustrates a cross section view of a system for testing pipe joint, in accordance with an embodiment of the invention.

Referring to the drawings, the invention will now be described in more detail. FIG. 1 illustrates a cross section view of a system (100) for testing pipe joint, in accordance with an embodiment of the invention. As shown in FIG. 1, a system (100) for testing pipe joint comprises a pipe joint having a male pipe section (102) and a female pipe section (104). The male pipe section (102) and female pipe section (104) are also said as spigot and socket respectively. At the junction of the male pipe section (102) and female pipe section (104), an opening is created through which leakage occurs. Thus, two gaskets (108) are inserted into the opening for securely sealing the pipe joint. Further, after insertion of two gaskets (108), an annular space (110) is created that is used for testing the pipe joint. The two gaskets (108) compressively seal the annular space (110).

The system (100) for testing the pipe joint further includes a test port (106). The male pipe section (102) is provided with a test space, at the time of manufacturing of a pipe. The test space is a cavity provided in the male pipe section for insertion of the test port (106). The test space connects with the annular space (110) created at the pipe joint. Further, the test port (106) is disposed into the test space such that the test port (106) intrudes into the annular space (110) and seals the annular space (110). The test port (106) is prefabricated and installed into the test space at the time of manufacture. Further, the test port (106) is fixed through the interior diameter of the male pipe section (102) and is secured into the test space of the male pipe section (102) using a fastening means. In accordance with embodiment of the invention, the fastening means is one of, but not limited to, adhesive and solvent welding. It will be appreciated by a person skilled in the art that other fastening means such as spin welding and/or other similar process for fastening the test port (106) in the test cavity.

Figure 2A:
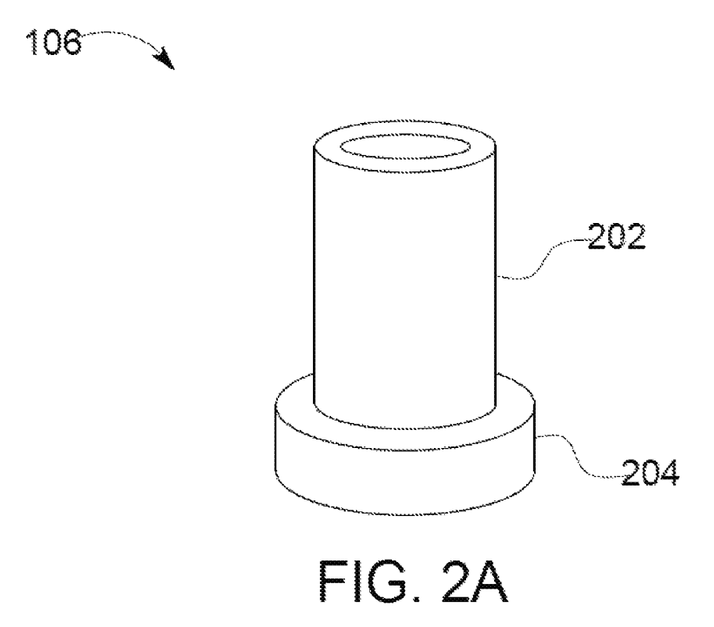
FIG. 2A illustrates an isometric view of the test port, in accordance with embodiment of the invention.

FIG. 2A illustrates an isometric view of the test port (106), in accordance with embodiment of the invention. As shown in FIG. 2A, the test port (106) comprises a hollow barrel (202) with a flange (204). The test space is provided such that the insertion of the test port (106) provides a constrained motion to the test port (106) inside the test space. In accordance with preferred embodiment of the invention, the test port (106) is of plastic and/or elastomer material so as to keep the cost of the overall system as low as possible and provides efficient results while testing.

Figure 2B:
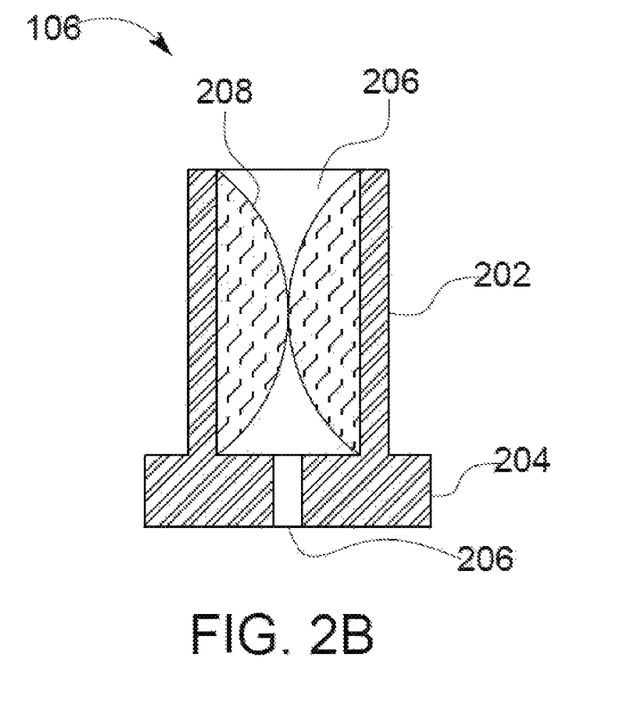
FIG. 2B illustrates a cross section view of the test port, in accordance with embodiment.

FIG. 2B illustrates a cross section view of the test port (106), in accordance with embodiment. As shown in FIG. 2B the test port (106) further includes an orifice (206) provided on the flange (204). The orifice (206) is a through hole that connects with the hollow barrel (202). The test port (106) is adapted to receive a needle (112) through the orifice (206). The diameter of the orifice (206) is provided appropriately with the diameter of the needle (112) such that a needle (112) is easily inserted into the orifice (206).

Additionally, the test port (106) is provided with a compressive sealing material (208) inside the barrel (202) in order to provide a secure sealing to the annular space (110), when the test port (106) is inside the test space. The compressive sealing material (208) is of resilient material and adapted to provide a secure sealing whether the needle (112) is inside the test port (106) or not. The test port (106) has no moving parts and relies only on the compression of the compressive sealing material (208) for sealing before, during, and after the test. In accordance with one embodiment of the invention, the compressive sealing material (208) is made up of elastomeric material appropriate to the application.

Referring back to FIG. 1, the system (100) further comprises a testing apparatus, in accordance with embodiment of the invention. The testing apparatus includes the needle (112), a tubing (114) and a pressure supply assembly (116). The needle (112) is attached to the tubing (114) and the tubing (114) is further attached to the pressure supply assembly (116) in order to provide a predetermined air pressure in the annular space (110) while testing of the pipe joint (106). In accordance with embodiment of the invention, the testing apparatus (112) further includes a ballast (118) loosely surrounding the outside diameter of the tubing (114) in order to provide necessary anchoring to the tubing and the needle (112) inside the test port.

Figure 3:
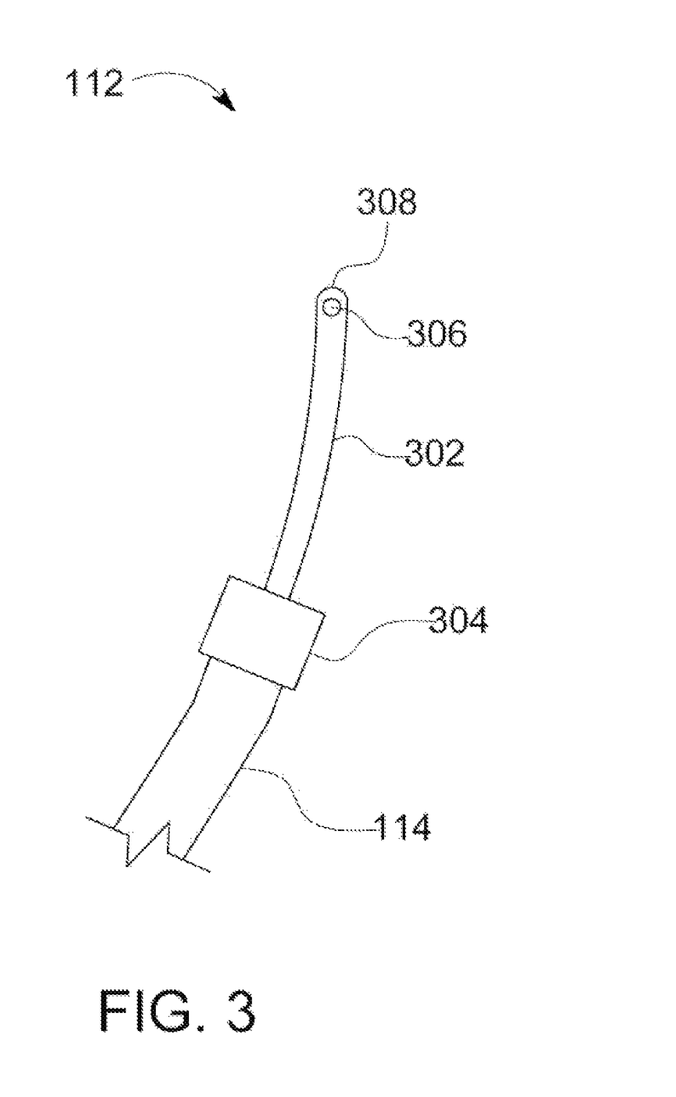
FIG. 3 illustrates a elevation view of a needle, in accordance with embodiment of the invention.

FIG. 3 illustrates an elevation view of the needle (112), in accordance with embodiment of the invention. As shown FIG. 3, the needle (112) comprises a hollow shaft (302) with a base (304). The needle (112) further includes an end orifice (306) capable of receiving air pressure from the pressure supply assembly (116) through tubing (114) to pressurize the annular space (110) for testing the pipe joint. The needle (112) is provided with a rounded tip (308), such that the needle (112) easily passes through the compressive sealing material (208) of the test port (106) without piercing the membrane of the compressive sealing material (208). Further, lubricating is done to needle (112) before inserting into the test port (106) for easy passage of needle (112) through the compressive sealing material (208). The needle (112) is made of a simple design and has no moving parts.

In accordance with another embodiment of the invention, the needle (112) may be similar to the pin used for filling air in a basketball and/or football. In accordance with preferred embodiment of the invention, the needle (112) is of stainless steel material. Further, the tubing (114) is of flexible plastic or rubber, having strength or reinforcement sufficient to resist test air pressures. The compressor supplying air test pressure is ideally a small portable unit capable of provided the limited pressure and volume required for this testing.

Figure 4:
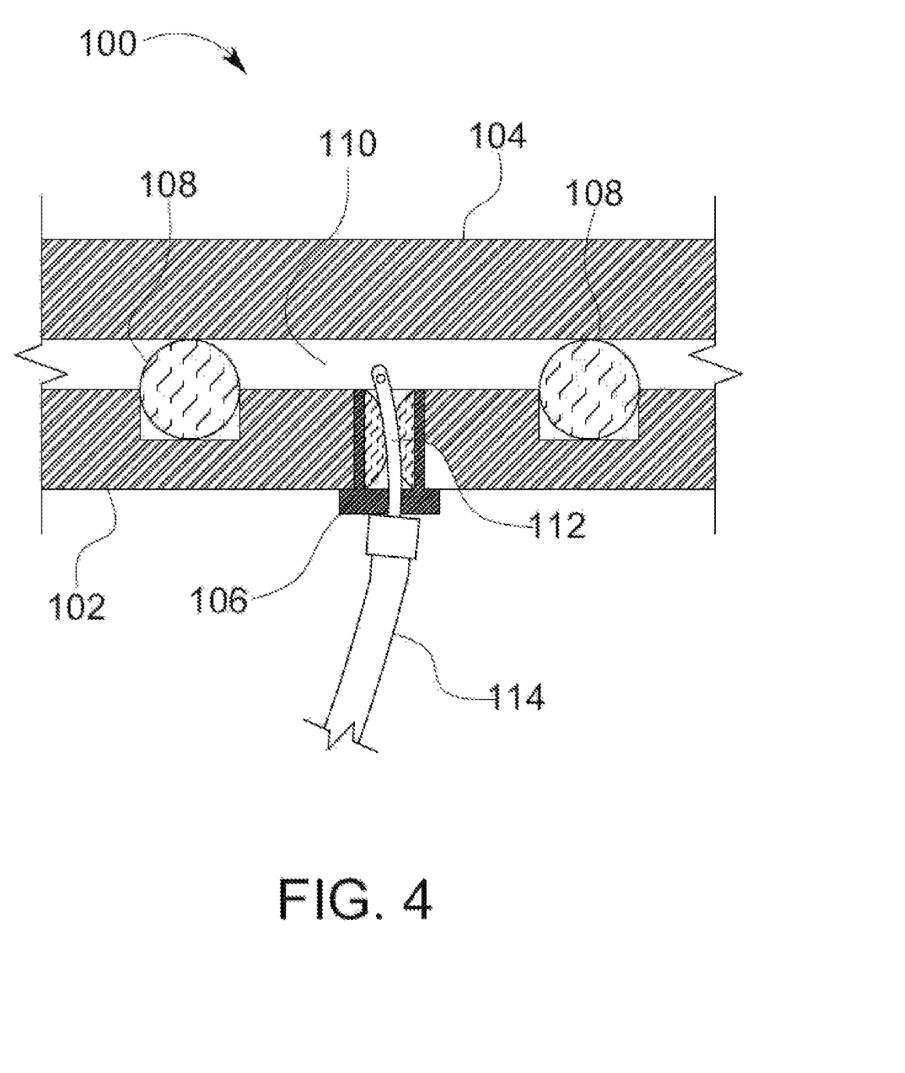
FIG. 4 illustrates a cross section side view of the system, in accordance with embodiment of the invention.

FIG. 4 illustrates a cross section side view of the system (100), in accordance with embodiment of the invention. As shown in FIG. 4, the needle (112) is inserted into the annular space (110) between the male pipe section (202) and female pipe section (204) of the pipe joint.

Figure 5:
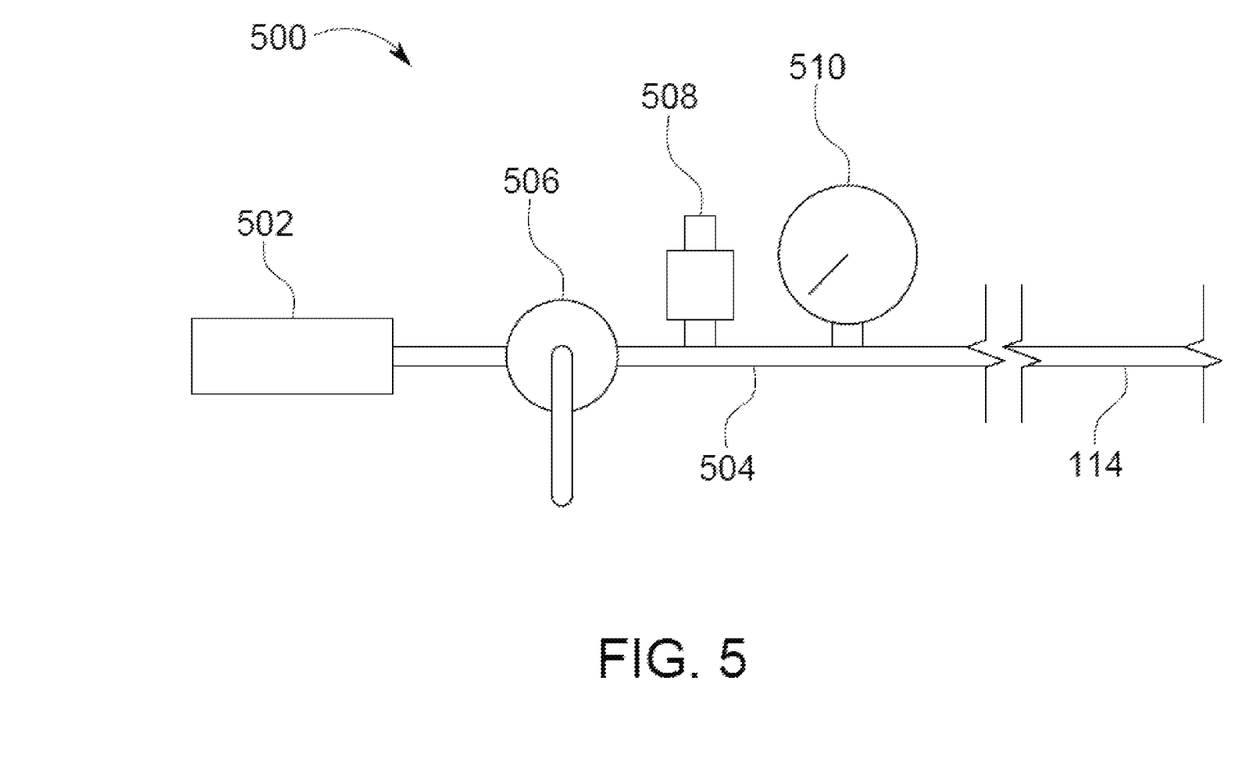
FIG. 5 illustrates a pressure supply assembly, in accordance with embodiment of the invention.

FIG. 5 illustrates a pressure supply assembly (116), in accordance with embodiment (500) of the invention. In accordance with typical embodiment of the invention, the pressure supply assembly (116) comprises a compressor (502), a pressure manifold (504) and a control valve (506). The compressor (502) is adapted to feed air pressure to a pressure manifold (504). The control valve (506) is provided to isolate the pressure manifold (504) from the compressor (502). In accordance with embodiment of the invention, the control valve (506) is one of, but not limited to, rotary type, needle type and butterfly type. Further, it would be obvious of a person skilled in the art to use any other type of control valves. In the preferred embodiment of the invention, two way ball valve type control valve (506) is used.

The pressure supply assembly further includes a pressure relief valve (508) and a pressure test gauge (510). The pressure relief valve (508) is adapted to prevent over pressurizing of the system. A predetermined value of pressure is set in the relief valve (508), allowing safe pressures to be assured during testing. On exceeding the predetermined value of air pressure in the system (100), the pressure relief valve releases the excess pressure out to the atmosphere. Further, the test gauge (510) is configured to measure the air pressure of the system (100). The test gauge (510) is one of, but not limited to, a digital gauge and a manual gauge. In the preferred embodiment of the invention, the measurement range of the test gauge is up to 15 psi.

Figure 6:
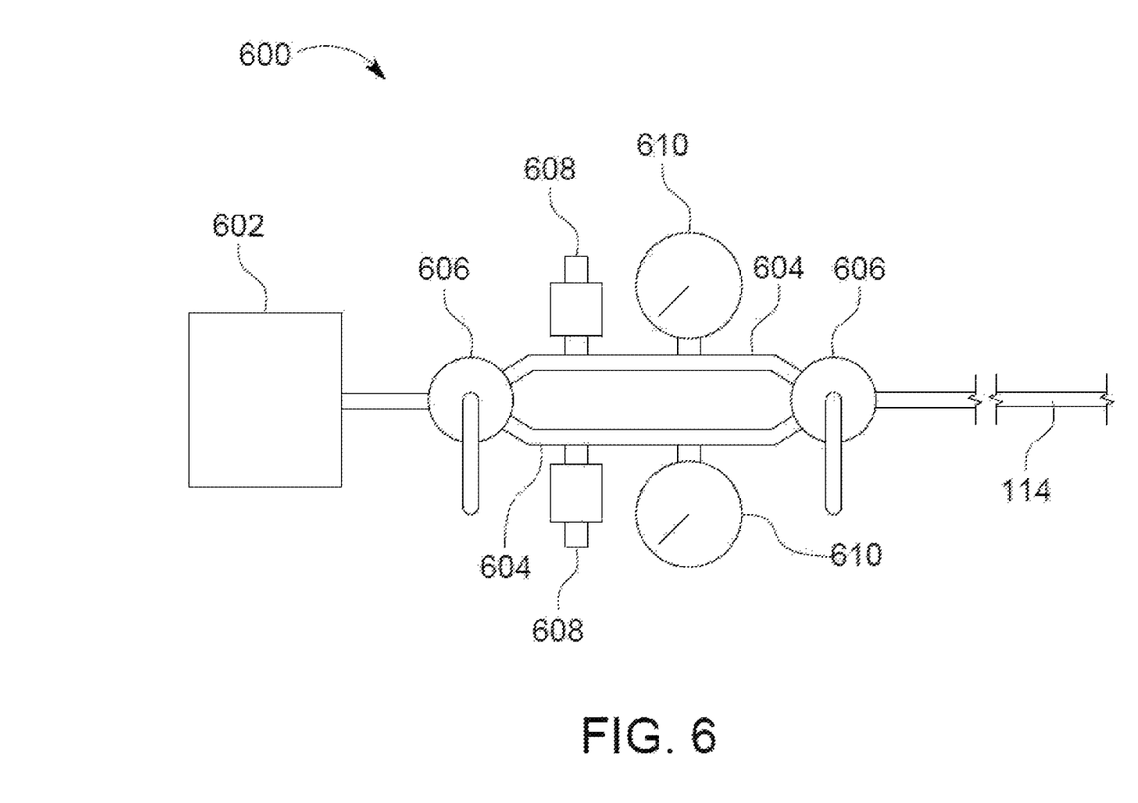
FIG. 6 illustrates the pressure/vacuum supply assembly, in accordance with another embodiment of the invention.

In one embodiment of the invention, the testing of the pipe joint is done by creating pressure and/or vacuum at the annular space (110). FIG. 6 illustrates a pressure/vacuum supply assembly (602), in accordance with another embodiment (600) of the invention. As shown in FIG. 6, the pressure/vacuum supply assembly (602) for creating negative vacuum at the annular space (100) comprises a pressure/vacuum manifold (604), a pressure/vacuum control valve (606), a pressure/vacuum relief valve (608) and a pressure/vacuum gauge (610). The system is capable of testing the pipe joint using pressure as well as in vacuum.

Figure 7:
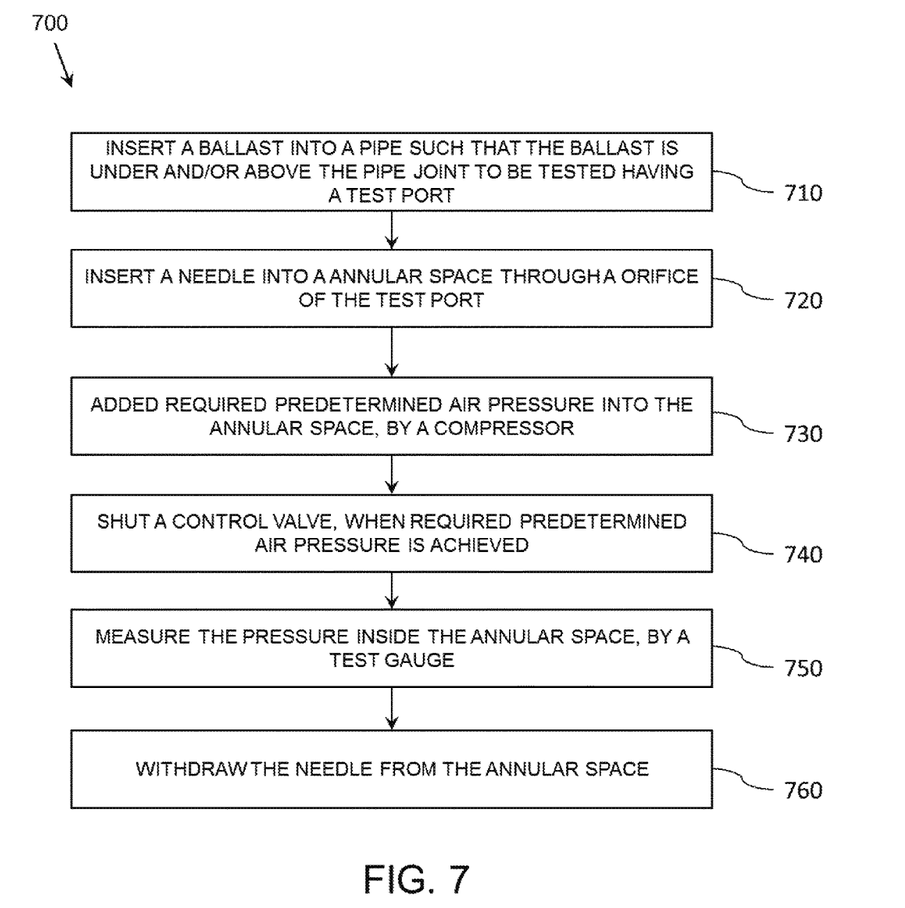
FIG. 7 illustrates a method for testing the pipe joint, in accordance with embodiment of the invention.

FIG. 7 illustrates a method (700) for testing the pipe joint, in accordance with embodiment of the invention. The method of testing the pipe joint begins at step 710, by inserting ballast (118) with tubing (114) into a female end of a test pipe (102) such that the ballast (118) is under a pipe joint to be tested. At step 720, a needle (112) is manually inserted through an orifice (206) of a test port (106) by reaching into the male end (102) of the test pipe.

At step 730, pipes are joined together to close a pipe joint and seal annular space (110) between the male (102) and female (104) pipe joint using resilient gaskets (108). At step 740, pressure is applied from a compressor (502) through tubing (114) until test pressure is achieved in the annular space (110). At step 750, control valve is closed to isolate the annular space (110) from the compressor (502). At step 760, the pressure performance of pipe joint is measured as required by test parameters. At step 770, ballast (118) with tubing (114) is extracted from the female end (104) of the test pipe by removing needle (112) from the test port (106). Further, the needle (112) is vertically withdrawn from the annular space (110) through test port (106) by translation of linear thrust of tubing (114) as translated through ballast (118).

In one embodiment of the present invention vacuum is applied through vacuum supply assembly (602). Thus, Pressure or vacuum both are used for testing the pipe joint.

Figure 8A:
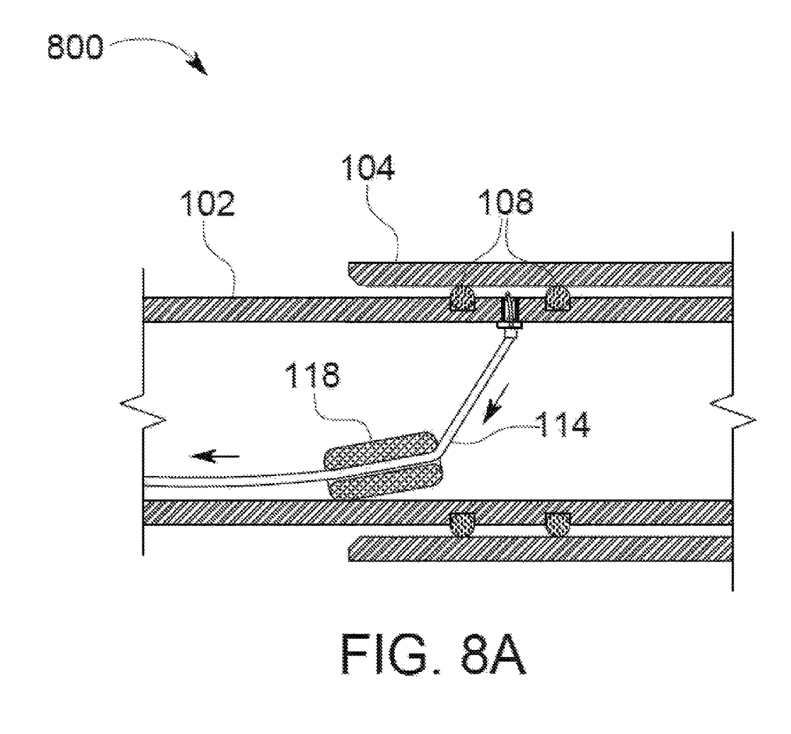
FIG. 8A illustrates a cross section side view of the system, in accordance with embodiment of the invention.

FIG. 8A illustrates the cross section side view of the system (100), in accordance with embodiment (800) of the invention. As shown in FIG. 8A, the ballast (118) pulls the tubing (114) in order to extract the needle (112) from the test port (106). Further, the ballast (118) is capable of translating a linear pull of the ballast (118) into a vertical withdrawal of the needle from the test port (106).

Figure 8B:
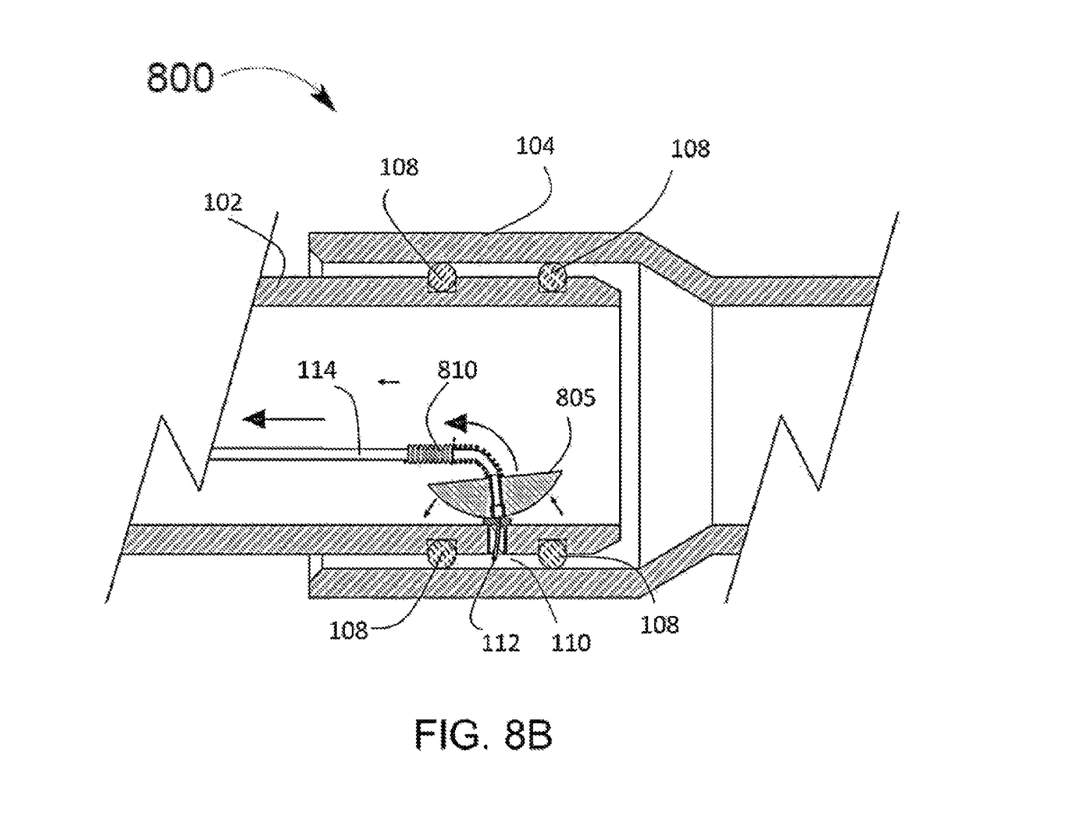
FIG. 8B illustrates a cross section side view of the system, in accordance with embodiment of the invention.

FIG. 8B illustrates a cross sectional side view of the system (100), in accordance with embodiment (800) of the invention. As shown in FIG. 8B, the tubing (114) comprises a puck (805). The puck (805) is of hemispherical shape as shown in FIG. 8B. The puck (805) is adapted to extract the needle (112) from the test port (106). The puck (805) is provided near the needle (112) such that the rounded portion of hemispherical puck (805) is facing towards the needle (112). While extracting the needle (112) from the test port (106), the puck (805) is given a seesaw movement that pivots the puck (805) along the axis of the needle (112). The seesaw movement of the puck (805) allows the needle (112) to come out of the test port (106) by applying withdrawal force through the tubing (114) while puling the tubing (114) away from the test port (106). Moreover, the tubing (114) further comprises a resilient cover (810). The resilient cover (810) is provided as a covering to the tubing (114). Also, the resilient cover (810) is adapted to protect the tubing (114) from excessive withdrawal force and assist in translation of thrust to the needle (112). In accordance with an embodiment of the invention, the resilient cover (810) is a spring.

In accordance with an embodiment of the invention, the puck (805) reduces the overall weight of the system (100) as the puck replaces the ballast (118) of FIG. 8A. Further, the puck (805) allows testing on the test port (106) regardless of the orientation of the test port (106) in the pipe joint, due to the hemispherical shape of the puck (805)

Figure 9:
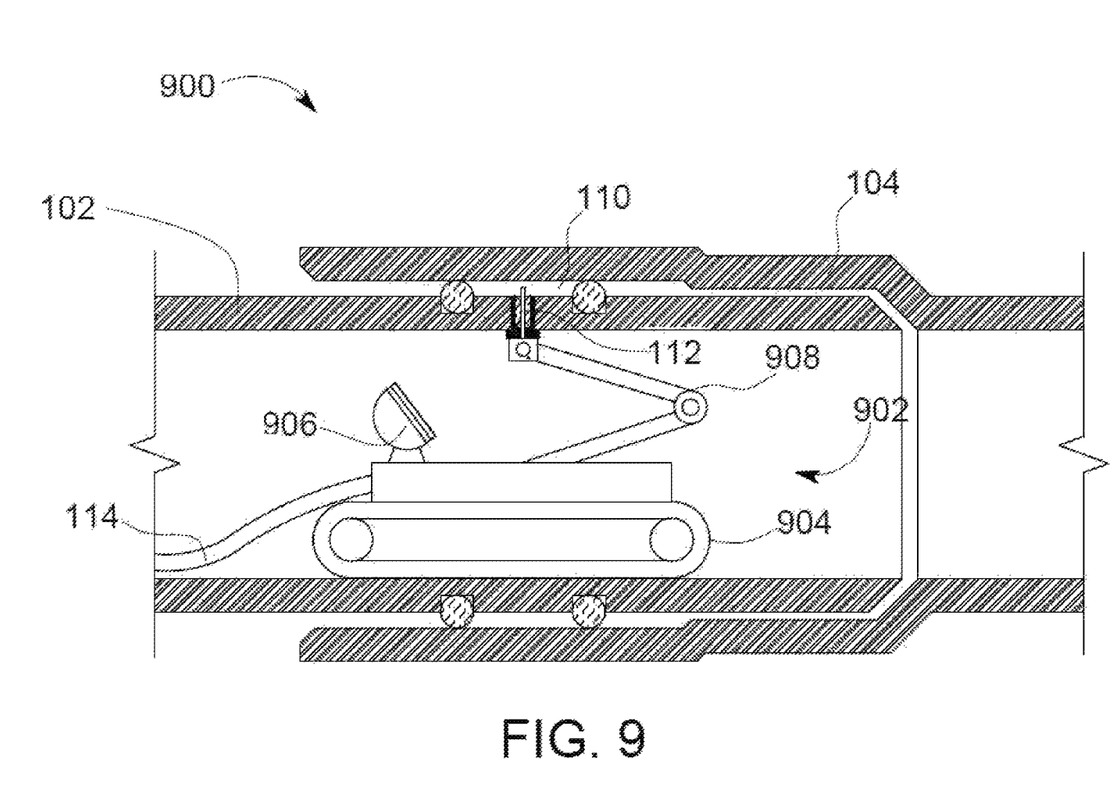
FIG. 9 illustrates a cross section side view of the system, in accordance with another embodiment of the invention.

FIG. 9 illustrates the cross section side view of the system (100), in accordance with another embodiment (900) of the invention. As shown in FIG. 9, the system (100) includes an inspection and repair unit (902) comprises a drive unit (904) and a video and light unit (906) mounted on a drive unit (904). The drive unit (904) is driven to the site of pipe joint inside the pipeline. Further, the inspection and repair unit (902) is controlled through a remote location outside the pipe. In one embodiment of the invention, a wire is sent with the tubing (114) in order to provide power to the drive unit (904) and relay video. Further, a video and light unit (906) is provided in the inspection and repair unit (900) that allows remote control of the testing the pipe joint. Further, the inspection and repair unit (902) comprises a controllable tubular arm (908) mounted on a drive unit (904) with a needle (112). The needle (112) allows the testing of the pipe joint as explained in previous embodiments.

Figure 10:
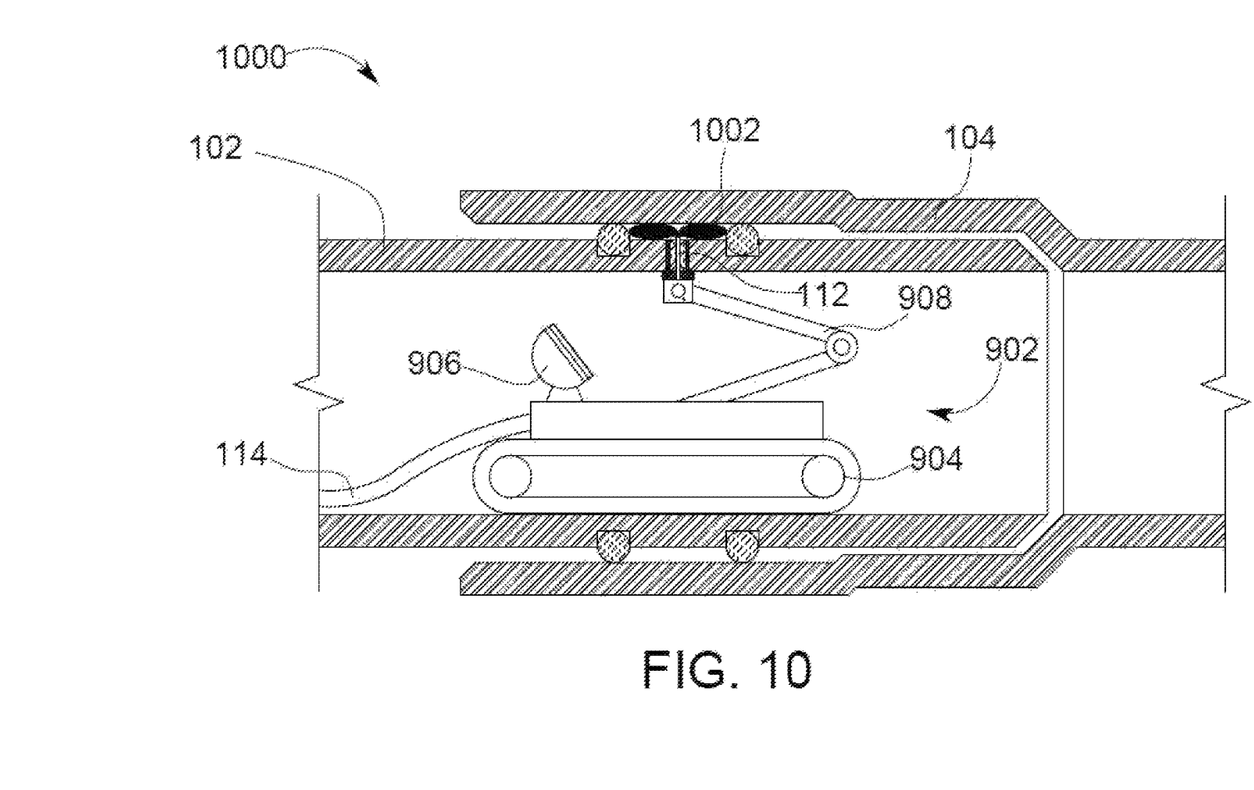
FIG. 10 illustrates a cross section side view of the system, in accordance with another embodiment of the invention.

Further, in case of failure of the pipe joint a sealing material is disposed in the annular space (110) for providing a leak-proof pipe joint. FIG. 10 illustrates the cross section side view of the system (100), in accordance with another embodiment (1000) of the invention. As shown in FIG. 10, the inspection and repair unit (902) is capable of injecting a repair material (1002) into the annular space (110) through the needle (112) for repairing the faulty pipe joint. In accordance with one embodiment of the invention, the semi-solid repair material (1002) is injection through the needle (112) into the annular space (110). Further, the repair material (1002) completely engulfs the annular space (110) and provides a secure sealing to the pipe joint. In one embodiment of the invention, the repair material (1002) is one of, but not limited to Nitrile Rubber and Ethylene Propylene Diene Monomer rubber (EPDM).

The system (100) and method (700) of testing pipe joint described through various embodiments above have a number of other advantages such as it allows testing the pipe joint without need of a person entering deep into the pipeline and performing the testing. Other advantage is that the testing can be performed on nay test port (106) regardless of its orientation in the pipe joint. Another advantage is that the testing is done at very low pressure and no bulky machinery and heavy hoses are required to perform testing. Rather, a small portable battery operated compressor is required to perform the testing of the pipe joint. Further, the test port (106) may be used for testing and/or repair at any time in the service life of the pipeline without any further effort, such as drilling test/repair holes.

Further, the system (100) of testing the pipe joint is also automated using an inspection and repair unit (902) that allows automatic inspection of the pipe joint. Moreover, the inspection and repair unit (902) is controlled from a remote location outside the pipeline. Additionally, on site repairing is done in the pipe that fails the leakage test. Further, the system (100) and method (700) allows testing of pipe joint in both air pressure and vacuum.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. A system (100) for testing a pipe joint, comprising:
a pipe joint having a male pipe section (102) and a female pipe section (104);
a test port (106) disposed in a test space provided on the male pipe section (102); and
a testing apparatus comprising:
 a needle (112);
 a tubing (114) attached to the needle (112);
 a pressure supply assembly (116) attached to the tubing (114) in order to provide a predetermined air pressure while testing of the pipe joint;
wherein the test space is a cavity provided in the male pipe section (102);
wherein the test port (106) is fixed into the interior diameter of the male pipe section (102) and is secured into the test space of the male pipe section (102) using a fastening means; and
wherein the test port (106) connects an annular space (110) created at a junction of the male pipe section (102) and female pipe section (104) by providing gaskets (108)
wherein the tubing (114) comprises a puck (805) adapted to extract the needle (112) from the test port (106).

2. The system (100) as claimed in claim 1, wherein the shape of the puck (805) is hemispherical.

3. The system (100) as claimed in claim 1, wherein the tubing (114) further comprises a resilient cover (810) adapted to protect the tubing (114) from excessive withdrawal force and assist in translation of thrust.

4. The system (100) as claimed in claim 3, wherein the resilient cover (810) is a spring.

* * * * *